Reissued Nov. 8, 1938

Re. 20,909

UNITED STATES PATENT OFFICE 20,909

DISCHARGE TUBE

André Claude, Nanterre, France, assignor to Société Anonyme pour les Applications de l'Electricite et des Gaz Rares Etablissements Claud-Paz & Silva, Paris, France, a corporation of France No Drawing. Original No. 2,030,963, dated February 18, 1936, Serial No. 718,885, April 3, 1934. Application for reissue February 11, 1938, Serial No. 190,131. In France April 8, 1933

16 Claims. (Cl. 176—122)

It has already been proposed to modify the light emitted from electric discharge tubes or receptacles. In one process, the glass envelope is constituted by colored or fluorescent substances, or is covered by them. It has also been proposed to produce a kind of light specially chosen, for example a sky-blue effect, by the application or use of a filter in conjunction with a mercury discharge lamp, or to fit up a double walled receptacle for the like purpose. It has also been proposed to mount a luminous discharge tube in a recess, the interior of which is coated with a suitable phosphorescent or other lining, or again, to provide an axial partition extending the whole length of the interior of the electric discharge tube and having on at least one side a coating of a fluorescent substance, for example zinc sulphide, oxide of scandium, or calcium tungstate, or entirely composed of a fluorescent material. Coatings of gold or silver have also been proposed with, as filling materials, sodium, cadmium or mercury. There has been suggested a combination of incandescent lamps and discharge tubes constituting table lamps, standard lamps, and hanging or ceiling lamps; arranged with the hot electrodes, heating, igniting and stabilizing apparatus, in the feet or the handles of the said lamps. Finally, it has been suggested to apply a homogeneous and adhesive coating to the interior of electric discharge tubes by spraying luminous paint over a binder of low surface tension and high viscosity, as for example a polyvalent alcohol such as glycerine, and to remove the binder or adhesive by means of heat or vacuum or both of these; it has also been proposed to add to the adhesive to be volatilized, compounds of metalloid elements such as boric acid, borax or other boron compounds, or sodium silicate.

As far as applicant knows, no tube provided with an internal luminous coating has yet been manufactured commercially.

An object of the present invention, is to provide electric discharge tubes and receptacles for commercial use, the interior of which is coated with a solid adhesive homogeneous and luminous layer. Another object of the invention is the elimination of causes which might lead in the course of working to the deterioration or premature diminution of the output of the discharge receptacle.

In particular, applicant has found that fatty matters or impurities must be carefully eliminated from the interior of the receptacle, that the adhesive must not be in excess and that this adhesive or binder will only have the desired effect when it is applied in the form of an extremely thin and homogeneous film, and that, finally, in order to avoid undesirable deposits of metallic vapors, the addition of the mercury or any other metal must be carefully measured according to the particular conditions applicable to each lamp or receptacle.

The substance serving as luminous coating must be free from all foreign impurities, and to obtain the desired homogeneous coating, it should be applied in a state of extremely fine division. It is also necessary to take care to insure the satisfactory construction of the discharge receptacles by preventing as far as possible any diffusion of hydrocarbon vapors on the final sealing-in after the evacuation and filling up with neon or any other gas or vapor.

A further advantage of the present invention consists in that, by a suitable selection of colorless or colored glass constituting the discharge receptacle, in combination with the luminous coating which it is desired to apply, it is possible to produce color effects which hitherto it has been impossible to obtain. For example, by using a tube of green glass and the known mixture of mercury, neon, argon and helium, as the conductive gas of the luminescent discharge, and by coating the inside of the tube, in accordance with the invention, with a luminous material such as a mixture of zinc sulphide and cadmium sulphide, there is obtained a yellow color, whereas hitherto the known discharge was of a green color.

Evidently a large variety of luminous effects thus become possible by varying the glass, the filling gas, and the internal luminous material.

In carrying out the present invention, whether the glass used is colorless or colored, and whatever may be the filling gas or the internal luminous coating, it is possible to construct novel discharge tubes or receptacles provided with the internal luminous coating, and in which the electric contact is established by means of suitable terminals capable of insertion in a handle or hollow support equipped with corresponding contacts, containing when necessary the transformer or other auxiliary apparatus for the ignition or maintenance of the discharge in the tube.

It is also necessary to prevent the production of unusual reactions which would counteract the effect of the luminous coating or which would tend to diminish the adhesion of the luminous substance to the inner surface of the glass, or which would form deposits adapted to soil the discharge tubes. To better understand the manufacture of the tubes according to the present invention, there will be given the following special particulars, it being understood that they do not restrict the scope of the invention.

A colorless or colored tube is given the final shape desired, for example that of a circle or any other shape; it is carefully freed from all fatty or like matter by the known process of washing with alcohol and then drying with ether. By means of a string passed through the tube, as is done for glass beads, there is passed through the tube a plug of fabric or a sponge which has been impregnated to the desired extent with a temporary binder, for example glycerine containing boric acid in solution. This process has however the disadvantage of causing irregularities and interruptions in the deposit of the liquid containing the luminescent substances; furthermore, it often happens and especially when the electric discharge apparatus has curves, or pronounced bends, that the string or the tube breaks. These disadvantages may be avoided by producing the movement of the impregnated body by the effect of a regulated force. In the elbows in particular the force should be greater than in the straight parts. The movement of the body may be obtained by means of the pressure of the gas, the said pressure being regulated for example by means of a two-way cock. On passing elbows, the pressure will be increased progressively and, when the body has passed the elbow, the pressure will be brought to its initial value. This pressure will be kept constant or be gradually increased or diminished according to the nature of the liquid forming the adhesive, the thickness desired of the layer, and the diameter of the tube.

There may be also used, instead of applying the pressure of a gas, the action of a vacuum on the other face of the impregnated body, which vacuum may be of greater or lesser degree and furthermore be adjustable.

Finally, the simultaneous action of pressure on one of the faces of the body and of a vacuum on the other face may be obtained.

The displacement of the impregnated body in the discharge apparatus may also be effected by the action of a magnetic field on one or more magnetic masses connected to the said impregnated body. This magnetic field may be adjustable so as to be increased with a view to the movement of the body in the bent part of the tube.

As regards the character of the adhesive, applicant has found that the mixture of one part of boric acid and of five parts of anhydrous glycerine is very suitable for the operation. In order to insure the homogeneity of the temporary adhesive, the plug is passed along in the opposite direction, the operation being repeated, using, if desired, decreasing quantities of glycerine or similar products. To complete the uniform application of the glycerine or the like, it is even essential in order to remove any excess beyond the quantity necessary to constitute a very thin and homogeneous film, to pass through the tube a dry plug or sponge and to repeat the operation in the reverse direction to remove as far as possible any trace of glycerine or the like, visible on careful examination. Only then is the luminescent substance introduced into the tube. This is effected by shaking the tube, in which there is an excess for example of sulphide of zinc, containing the ingredients necessary for producing the luminescence and withdrawing by shaking or other means any material not adhering to the film of glycerine or like product; it should be pointed out in this connection that any accumulation of glycerine or similar product in the bends would cause a diminution of luminosity.

After the luminous coating has been applied on to the internal surface of the tube, the temporary adhesive is removed by heating. When the mixture of glycerine and boric acid has been used, the inventors have found that it is advisable to heat the tube slightly above the boiling point of the glycerine, and to maintain a temperature of 330 to 350° C. for about twenty to thirty minutes.

The heating is stopped when the temperature of 350° C. is reached, and the tubes are allowed to slowly cool. The electrodes are then inserted and sealed; the sealing must be carried out in such manner as to prevent any diffusion of hydrocarbon gases into the discharge tube. If considered necessary, a spirit flame may be used to this end. After this, the tubes are ready for the vacuum to be created, and this is obtained by the known process, taking care to free the electrodes from any occluded gas, by heating by means of high potential or the like, and also reducing the temperature to the limit which will not cause deterioration of the luminous substance. In general, a temperature of 350° C. approximately is necessary and has given satisfactory results.

Before sealing the tube, one or more rare gases from the air are introduced at a low pressure and, if desired, a small quantity of metal, such as mercury, taking care to avoid any excess of the said metal beyond that which is actually necessary.

The discharge receptacle or tube is now ready for insertion in the contact pieces of a support, handle or other similar apparatus which, for greater convenience, will be hollow and in which the supply terminals, the transformer—if necessary—and another auxiliary apparatus required for the ignition and the stabilization of the discharge will be fitted.

I claim:—

1. The method of manufacturing gas filled electric luminous discharge tubes and the like having their inner surface provided, by the intermediary of a volatilizable cementing agent, with a layer of luminescent or phosphorescent substance, comprising applying the cementing agent in an extremely thin and uniform layer on said surface by wiping with a plug of elastic absorbent material impregnated with the cementing agent, depositing the luminescent or phosphorescent substance in a thin film on the wiped surface, and eliminating the cementing agent.

2. The method of manufacturing gas filled electric luminous discharge tubes and the like having their inner surface provided, by the intermediary of a volatilizable cementing agent, with a layer of luminescent or phosphorescent substance, comprising applying the cementing agent in an extremely thin and uniform layer on said surface by wiping with a plug of elastic absorbent material impregnated with the cementing agent, attenuating the layer of cementing agent by wiping with a plug of dry elastic material, depositing the luminescent or phosphorescent substance in a thin film on the wiped surface, and eliminating the cementing agent.

3. The method according to claim 1 in which the plug is moved through the tube by a regulatable force.

4. A method according to claim 1 in which the plug is moved through the tube by a pressure differential.

5. A method according to claim 1 in which the plug is moved through the tube by means of a magnetic field operative upon a magnetic body embedded in the plug.

6. A method according to claim 1 in which the luminescent substance is introduced along with and in solution in the cementing agent.

7. The method of manufacturing gas filled electric luminous discharge tubes and the like having their inner surface provided, by the intermediary of a volatilizable cementing agent, with a layer of luminescent or phosphorescent substance, comprising applying the cementing agent in an extremely thin and uniform layer on said surface by wiping with a plug of elastic absorbent material impregnated with the cementing agent, depositing the luminescent or phosphorescent substance in a thin film on the wiped surface, and sealing the electrodes in the tube with avoidance of diffusion of hydrocarbons into the tube.

8. A method according to claim 7 in which the electrodes are sealed into the tube with the aid of a spirit flame.

9. In the method of providing the inner surface of luminous tubes with a layer of luminescent substance by the intermediary of a binding agent, by wiping said surface with a plug involving an elastic material in contact with the binding agent, the step which comprises moving said plug through the tube by a force derived from energy localized in the medium between the source providing this energy and said mass, said force being adjustable in all the positions of the plug, during the displacement of the latter.

10. In the method of providing the inner surface of luminous tubes with a layer of luminescent substance by the intermediary of a binding agent, by wiping said surface with a plug involving an elastic material in contact with the binding agent, the step which comprises moving said plug through the tube by an inner gaseous pressure, said pressure being adjustable in all the positions of the plug, during the displacement of the latter.

11. In the method of providing the inner surface of luminous tubes with a layer of luminescent substance by the intermediary of a binding agent, by wiping said surface with a plug involving an elastic material in contact with the binding agent, the step which comprises moving said plug through the tube by means of a magnetic field operated upon a magnetic body integral with the movable plug, said field being adjustable in all the positions of the plug, during the displacement of the latter.

12. The method of providing the inner surface of luminous tubes with a uniform layer of luminescent substance by the intermediary of a binding agent, comprising wiping said surface with a plug involving an elastic material impregnated with said binding agent and moving said plug through the tube by a force derived from energy localized in the medium between the source providing this energy and said mass, said force being adjusted according to the variations of the friction of the plug against the walls of the tube.

13. The method of providing the inner surface of luminous tubes with a uniform layer of luminescent substance by the intermediary of a binding agent, comprising wiping said surface with a plug involving an elastic absorbent material impregnated with said binding agent and moving said plug through the tube by an inner gaseous pressure, said pressure being adjusted according to the variations of the friction of the plug against the walls of the tube.

14. The method of providing the inner surface of luminous tubes with a uniform layer of luminescent substance by the intermediary of a binding agent, comprising wiping said surface with a plug involving an elastic absorbent material impregnated with said binding agent and moving said plug through the tube by means of a magnetic field operated upon a magnetic body integral with a movable plug, said field being adjusted according to the variations of the friction of the plug against the walls of the tube.

15. The method of providing the inner surface of bent luminous tubes with a uniform layer of luminescent substance by the intermediary of a binding agent, comprising wiping said surface with a plug involving an elastic absorbent material impregnated with said binding agent and moving said plug through the tube by means of a magnetic field operated upon a magnetic body integral with a movable plug, said field being adjusted according to the variations of the friction of the plug against the walls of the tube.

16. A method of providing the inner surface of luminous tubes with a uniform layer of luminescent substance by the intermediary of a binding agent, according to claim 9, while using a binding agent comprising, besides a substance of low surface tension and high viscosity, a compound of a metalloid element which insures the adhesion of the luminous substance to said surface.

ANDRÉ CLAUDE.